Feb. 2, 1971 H. OHNSORGE 3,560,925

DETECTION AND CORRECTION OF ERRORS IN BINARY CODE WORDS

Filed March 25, 1968 4 Sheets-Sheet 1

INVENTOR
Horst Ohnsorge

BY Spencer & Kaye
ATTORNEYS

Feb. 2, 1971 H. OHNSORGE 3,560,925

DETECTION AND CORRECTION OF ERRORS IN BINARY CODE WORDS

Filed March 25, 1968 4 Sheets-Sheet 2

INVENTOR
Horst Ohnsorge
BY Spencer & Kaye
ATTORNEYS

INVENTOR
Horst Ohnsorge
BY Spencer & Kaye
ATTORNEY

Feb. 2, 1971 H. OHNSORGE 3,560,925

DETECTION AND CORRECTION OF ERRORS IN BINARY CODE WORDS

Filed March 25, 1968 4 Sheets-Sheet 4

INVENTOR
Horst Ohnsorge

BY Spencer & Kaye

ATTORNEYS.

United States Patent Office 3,560,925

Patented Feb. 2, 1971

3,560,925

DETECTION AND CORRECTION OF ERRORS IN BINARY CODE WORDS

Horst Ohnsorge, Erstetten, Germany, assignor to Telefunken Patentverwertungsgesellschaft m.b.H., Ulm (Danube), Germany Filed Mar. 25, 1968, Ser. No. 715,793
Claims priority, application Germany, Mar. 25, 1967, T 33,526, T 33,527
Int. Cl. G06f *11/12;* H03k *13/32*
U.S. Cl. 340—146.1 8 Claims

ABSTRACT OF THE DISCLOSURE

A method and arrangement for detecting and correcting errors occurring in code words made up of a data code and a test code, which test code is derived by multiplying the data code by a selected coding matrix, by multiplying the received word by an error matrix, composed of the coding matrix supplemented by a unit matrix, to derive an error code which will equal zero only when no errors appear in the received word, and by adding a succession of error-correction words in a modulo 2 manner to the received word until producing an addition word whose error code is equal to zero.

BACKGROUND OF THE INVENTION

The present invention relates to digital computers, and particularly to error detection and correction techniques therefor.

The invention is concerned with a method and an arrangement for the detection and/or correction of errors occurring in systematic codes containing binary data. The invention is particularly intended for use in systems wherein each data code $[x]$ having $k$ bits is supplemented by a test code $[y](=[a][x])$ having $m$ bits and is transmitted as a code word $[x^+]$ having $n$ bits $(n=m+k)$, where $[a]$ represents a selected coding matrix. When such code words are employed, any errors occurring over the transmission path and having the effect of changing a code word $[x^+]$ into an erroneous $n$ bit received word $[x^{++}]$ produces an error code $[F](=[b][x^{++}])\neq 0$, where a correct code word $[x^+]$ would result in an error code $[F]=0$, and $[b]$=the coding matrix $[a]$ supplemented by the unit matrix [I].

A simple error correction procedure using the so-called "fire codes" has already been suggested for systematic codes and is described in detail in the textbook Error Correcting Codes, by Peterson (MIT Press and John Wiley, New York, 1962, second edition). This procedure is particularly well suited for the correction of group errors but cannot be effectively used if the errors are of a random nature. Peterson also suggests a method for correcting errors occurring in the so-called Bose-Chaudhuri codes, which method requires a great deal of circuitry and can not be successfully employed for all types of systematic codes.

For general use with all systematic codes, the only presently known method for error correction involves the use of the so-called code book or its highly cumbersome automated equivalent. According to this method, which is referred to as "Maximum Likelihood Detection," all possible code words are compared with the received word and a determination is made of which code word is most like the received word. If a code word contains $k$ bits, a maximum of $2^k$ comparisons must be made according to this method in order to determine which word is closest to the received word. This method, in addition to requiring considerable technical effort, is extremely time-consuming.

SUMMARY OF THE INVENTION

It is a primary object of the present invention to eliminate these drawbacks and difficulties.

Another object of the invention is to improve the detection and correction of errors appearing in binary code words.

Still another object of the invention is to provide an error detection and correction procedure which can be used for all systematic codes and which considerably reduces the amount of time required, as well as the technical effort involved, in effecting such error detection and correction.

These and other objects according to the invention are achieved by the provision of a novel error detection arrangement for use in a data handling system in which binary data is transmitted over a transmission path in the form of a systematic code composed of $n$ bit words each made up of a data code having $k$ bits and a test code having $m$ bits, where $k+m=n$, and the test code is the product of the data code multiplied by a coding matrix $[a]$, and where each code appearing at the end of the transmission path will, if multiplied by a test matrix $[b]$, which is formed by the coding matrix $[a]$ supplemented by the unit matrix [I], yield an error code [F] which equals zero if no errors are present in the received word and which is unequal to zero if an error is present in the received word. The error detection apparatus according to the invention includes first register means having $n$ stages and connected to receive each word in succession, matrix means providing an electrical circuit representation of the matrix $[b]$ and connected to each stage of the register means for producing an output representing the error code [F] for each received word, and test means connected to the output of the matrix means for selecting, whenever [F] is unequal to zero, that one of a predetermined number of $n$ bit error-correction words which, when each bit of the error-correction word is added to a corresponding bit of the received word by modulo 2 addition, results in a word whose error code [F] equals zero.

DESCRIPTION OF THE PREFERRED EMBODIMENTS

A starting point for the present invention is the fact that in systematic codes having the form of $n$ bit code words, the number $m$ of redundancy, or check, bits is generally substantially smaller than the number $k$ of data bits, and that, consequently, the number $2^n$ of possible code words, i.e., the number of possible combinations of $n$ binary bits, is several orders of magnitude greater than the number $2^m-1$ of correctable erroneous received words associated with one code word.

These facts lead to two considerations of the problem on which the present invention is based.

Firstly, it can be assumed that a received code word is the result of a code word developed by modulo 2 addition of a binary code designated as an error-correction code. The arithmetic rules for modulo 2 addition require that if a binary combination is added twice to a first binary combination, the resulting sum is identical to the first binary combination. If, therefore, the errors contained in a received word are correctable, it must be possible to nullify these errors by the addition of a certain error-correction code and thus to recreate the originally transmitted code word.

In accordance with these considerations, the present invention solves the existing problem in the following manner:

Whenever an error code $[F]\neq 0$ appears at the end of the transmission path, there are effected a succession of modulo 2 additions between the incorrect received word $[x^{++}]$ and each of a predetermined number of error-correction words, the succession of additions being carried out until one such addition yields an addition word whose error code $[F]=0$. The term "error-correction word" is here understood to be a $n$ bit binary combination whose individual bits are added in a modulo 2 addition to produce a code word $[x^{+}]$ which corresponds to a correctable received word $[x^{++}]$.

According to an advantageous further feature of the invention, all of the $2^m-1$ error correction words, each being capable of correcting between one and $e$ errors, where $e$ is the maximum number of correctable errors, are subdivided into $e$ groups with each group containing all of the error-correction words capable of correcting the same number of errors. In addition, all of the error codes [F] are combined into $e$ groups with each group containing the codes associated with a certain group of error-correction words.

According to a further feature of the present invention, each of the error-correction words is formed so as to correspond to between one and $i$, with $i$ being less than $e$, thus permitting detection of noncorrectable errors when the error code does not equal 0 as a result of the modulo 2 addition of any of the error correction words to the received code words $[x^{+}]$.

Figure 1:
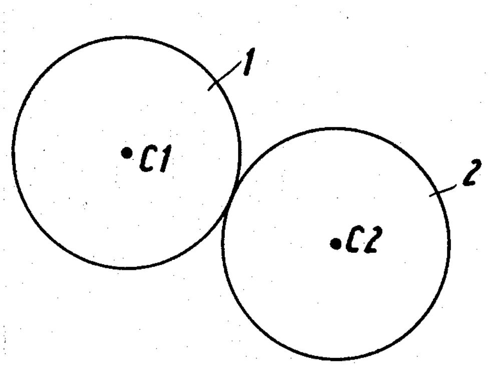
FIG. 1 is a pictorial diagram used in explaining the principles of the present invention.

Reference will now be made to FIG. 1, which is a pictorial representation showing two words C1 and C2 each having an associated correction range 1 or 2. For reasons of simplicity, these ranges are shown in the drawing as circles. The range for each code word encompasses all binary combinations which, due to the redundancy of the systematic coding employed, can be traced back, with the aid of an error-correction process, to the correct code word C1 or C2, respectively. In general, the radius of the circle is representative of the number of erroneous bits appearing in a received word.

When it is desired to effect an error correction, it is only necessary to create a certain correction range around each code word and then to simply indicate the existence of noncorrectable errors for any binary combinations outside of these ranges. However, it is also possible to associate each possible binary combination with a given correction range. When the codes are not highly redundant, the danger then exists that a highly erroneous code word will fall into the correction range of an adjacent code word so that the code word formed during the correction process will not be the same as the originally transmitted code word.

Figure 2:
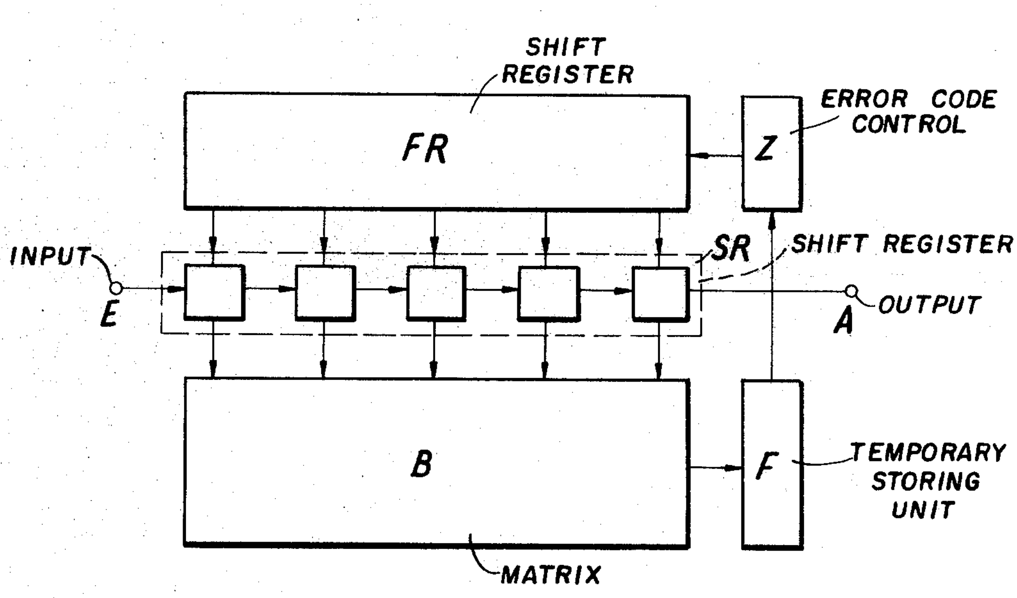
FIG. 2 is a simplified schematic diagram of one embodiment of the present invention.

Turning now to FIG. 2, there is shown one form of apparatus which can be used for carrying out the present invention and which includes a shift register SR into which each received word arriving at input E is first written. The shift register SR has $n$ stages equal to the number of bits in each received word and the shift register stages are connected to a coding device B which codes the received word so as to produce an error code [F] which is delivered to a temporary storing unit F. From the unit F the error code is delivered to an error code register FR which is generally consisted by a shift register provided with feedback in which the error-correction words are generated in a systematic manner, the error-correction words being generated consecutively and in order of increasing number of errors. However, the error code register could have other forms of construction. For example, it could be constructed in the form of a code book containing all possible error-correction words.

The error code register FR is provided, in the present example, with parallel outputs which lead to the individual stages of the shift register SR in which the received word has been stored. In the shift register SR the received word and each successive error-correction word are added and each addition produces a different addition word which is delivered to the coding device B to produce the associated error code [F]. As soon as the output from the shift register SR produces an addition word whose error code $[F]=0$, the addition word then in the shift register SR will be identical with the transmitted code word $[x^{+}]$ and the restored word is fed out of the shift register via output A.

If the error code formed by combining the addition word in the shift register SR with the matrix $[b]$ is not equal to 0, the code word $[x^{++}]$ originally delivered to the shift register is recreated, for example by a second addition of the same error-correction word, and the search for the proper error-correction word is resumed by adding the next succeeding error-correction word to the received word.

The arrangement of FIG. 2 is shown to further include a device Z which could, if desired, be deleted from the circuit so that the output of device F would be connected directly to register FR. The device Z is provided, according to an additional feature of the invention, to detect certain characteristic features of the error codes delivered thereto from the device F and to control the error code register FR by emitting a corresponding binary combination in such a manner that only certain groups of error-correction words will be generated, this permitting the error detection procedure according to the present invention to be considerable accelerated.

In those error-correction procedures in which the maximum possible number of errors is not to be corrected, the process described above is interrupted after a certain number of error-correction words have been tested and an indication is then provided of the existence of a noncorrectable error.

A particular characteristic of each error code is its weight $g$, the weight being determined by the number of binary "one's" which it contains. If, for example, the error code contains only one "one," this indicates that the $k$ bit data code was correctly transmitted and that the appearance of an error code which does not equal zero could be caused only by errors in the $m$ bit test code. In such a case, if no further use is to be made of the test code associated with the code word, the data code can be read out of the shift register directly without requiring the performance of the correction procedure.

If the error code contains two binary "1's," this means that a correction can be made by an error-correction word containing a single binary "1." It is thus necessary to generate only the few error-correction words meeting this requirement in order to correct such an error.

If the error code has a weight of 3 (it contains three binary "1's"), the error-correction word required for such a correction must contain two binary "1's" so that it is only necessary to generate error-correction words of this type, and there is no need to generate error-correction words having a single binary "1" or three or more "1's."

The shift register SR shown in FIG. 2 is a conventional device of the type described, for example, in the Peterson text cited above, as well as in Digital Computer Components and Circuits, by R. Richards (D. Van Nostrand Co., New York, 1957), and Pulse and Digital Circuits, Millman and Taub (McGraw-Hill Book Co., New York, 1956). In addition, the shift registers of FIG. 3 may be of the type described in these texts.

The error word register FR is essentially a memory element in which the individual error-correction words are stored and out of which they can be read in accordance with the nature of this memory or in a predetermined or arbitrary sequence. For purposes of the present invention, a diode matrix store is preferably employed. In such a store, a particular address is associated with each stored code combination.

The element Z can have many different forms of construction. The structure of this unit becomes more complicated as the size of the group of error-correction words to be selected thereby decreases. However, it is common to all contemplated embodiments of the invention that the unit Z can be assembled easily from known logic circuits and elements once the desired grouping of the error-correction words has been decided upon.

A simple embodiment of this unit results when the error codes are handled according to the number of binary "1's" which they contain. In such case, the unit Z can consist of a known counter which produces a count depending on the number of "1's" in the error code, which count determines the control command sent to the register FR. Depending on tne particular command thus produced, a certain number of addresses in the register FR will be called and the above-described procedure for forming the control command will assure that one of the error-correction words in the address called will be the desired one. Suitable counter devices and logic circuits and circuit elements are described, for example, in: Arithmetic Operations in Digital Computers, R. Richards, (D. Van Nostrand Co., New York, 1955); Logical Design of Digital Computers, M. Phister, Jr. (New York, 1958); and Switching Circuits and Logical Design, S. H. Caldwell (New York, 1958).

Figure 5:
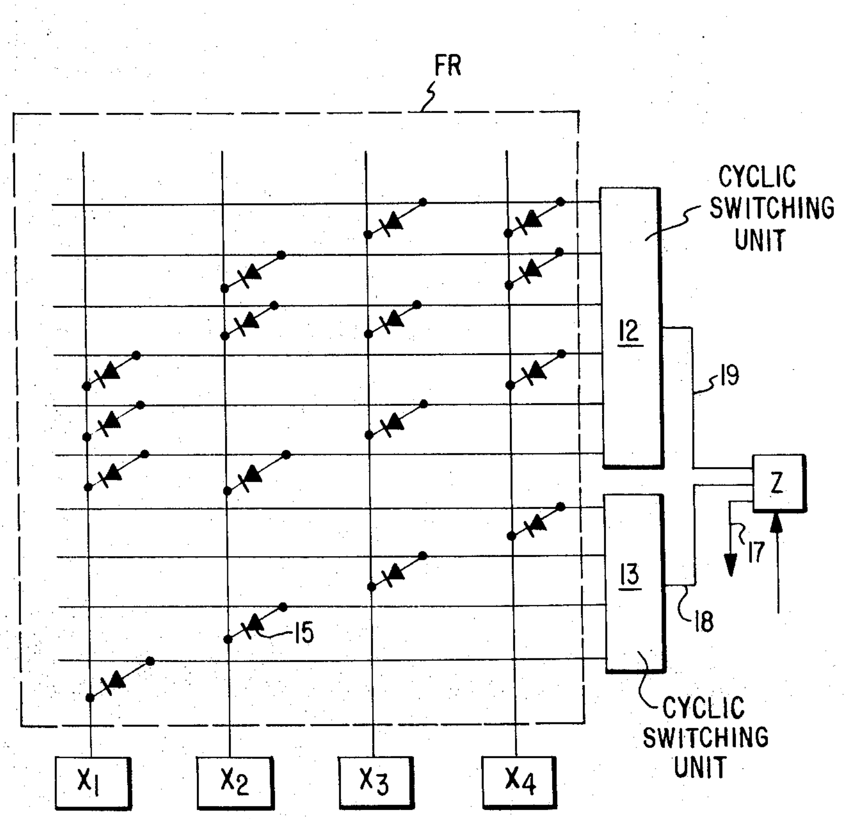
FIG. 5 is a schematic diagram of a second portion of the arrangement of FIG. 2.

A simple operative arrangement of the type described above for producing error correction words is illustrated in FIG. 5. In this arrangement, unit FR is a diode matrix store composed of diodes 15 connected between cyclic switching units 12 and 13, providing inputs to the matrix, and data word stages $X_1$, $X_2$, $X_3$ and $X_4$ of register SR, receiving the matrix outputs.

The diode matrix is constructed according to the principles outlined at pp. 56–60 of the above cited Richards text so that each of the lower four matrix rows will apply to the data word in register SR a respective one of the error correction words associated with an error code [F] having two binary "1's" and each of the upper six matrix rows will apply to the stored data word a respective one of the error correction words associated with an error code [F] having three binary "1's."

Unit Z, which can, as noted above, be a simple counter, has three outputs 17, 18 and 19. A signal appears at output 17 whenever the counter has received zero or one binary "1" from unit F and this signal, which indicates that no error exists in the data word in stages $X_1$ to $X_4$ of register SR, can be employed to transfer the data word out of the register. A signal appears at output 18 whenever unit Z has received two "1's" from unit F and serves to activate a cyclic switching unit 13 having outputs connected to pulse each of the lower four matrix rows in succession. An output appears on line 19 whenever unit Z has received three "1's" from unit F and serves to actuate cyclic switching unit 12 having outputs connected to pulse each of the upper six matrix rows in succession.

Units 12 and 13 could be constituted by any well-known devices capable of producing a signal at each output in succession upon being actuated. For example, they could be stepping switches, ring counters, or simple shift registers, as described in chapter 9 of the above-cited Richards text, arranged to shift a pulse through from one output to the next under the control of the clock pulses employed in the system.

When either of units 12 and 13 is actuated, it causes each of its associated error correction words to be delivered in sequences to register SR. After each word has been added in a modulo-2 manner to the data word in SR, the unit F is interrogated to determine whether it is now producing an error code containing zero or one binary "1," indicating that the data word has been corrected.

If it is also desired to correct an erroneous test code word, a further group of diode matrix rows could easily be provided and connected to the test code stages $X_5$–$X_7$ of register SR, these rows being controlled by a further cyclic switching unit actuated by a count of one from unit Z.

The coding device B is preferably constituted by a matrix circuit having $n$ column wires each connected to receive a respective bit of the received word and a plurality of row wires equal in number to the bits of the error code for providing the error code output, and a plurality of modulo 2 addition elements each connected between a column wire and a row wire at an intersection corresponding to a binary "1" of the matrix.

The storing unit F may also be in the form of a shift register having a number of bistable stages equal to the number of bits in the error code, each stage being connected to one of the row wires of the matrix B. After each received word has been processed in the matrix B, the resulting error code is temporarily stored in the unit F.

For further explanation now the supplementation of a data code $[x]$ having $k$ bits by a test code $[y]=[a][x]$ having $m$ bits will be demonstrated.

With a data code $$[x]=(x_1\,x_2\,x_3\,x_4)=(1\,0\,1\,1)$$

and a selected coding matrix $$[a]=\begin{bmatrix}1110\\1101\\1011\end{bmatrix}$$

the test code $[y]$ is produced by the following operations:

$$[y]=[a]\cdot[x]=\begin{bmatrix}1110\\1101\\1011\end{bmatrix}\cdot\begin{bmatrix}1\\0\\1\\1\end{bmatrix}=\begin{bmatrix}0\\0\\1\end{bmatrix}$$

the bits of the test code being $$[y]=(x_5\,x_6\,x_7)=(0\,0\,1)$$

Then the transmitted code word $[x^+]$ has the following form:

$$[x^+]=(x_1\,x_2\,x_3\,x_4\,x_5\,x_6\,x_7)=1\,0\,1\,1\,0\,0\,1)$$

supposed now that during the transmission of the code word $[x^+]$ one bit e.g. the bit $x_4=1$ is inverted into a false bit $x_{4f}=0$ then at the receiving station the received word has the form $$[x^{++}]=(x_1\,x_2\,x_3\,x_{4f}\,x_5\,x_6\,x_7)=(1\,0\,1\,0\,0\,0\,1)$$

For decoding the matrix $$[b]=[a;\,I]=\begin{bmatrix}1&1&1&0&1&0&0\\1&1&0&1&0&1&0\\1&0&1&1&0&0&1\end{bmatrix}$$
$$\underbrace{\qquad\qquad}_{[a]}\quad\underbrace{\qquad\quad}_{[I]}$$

is used.

Figure 4:
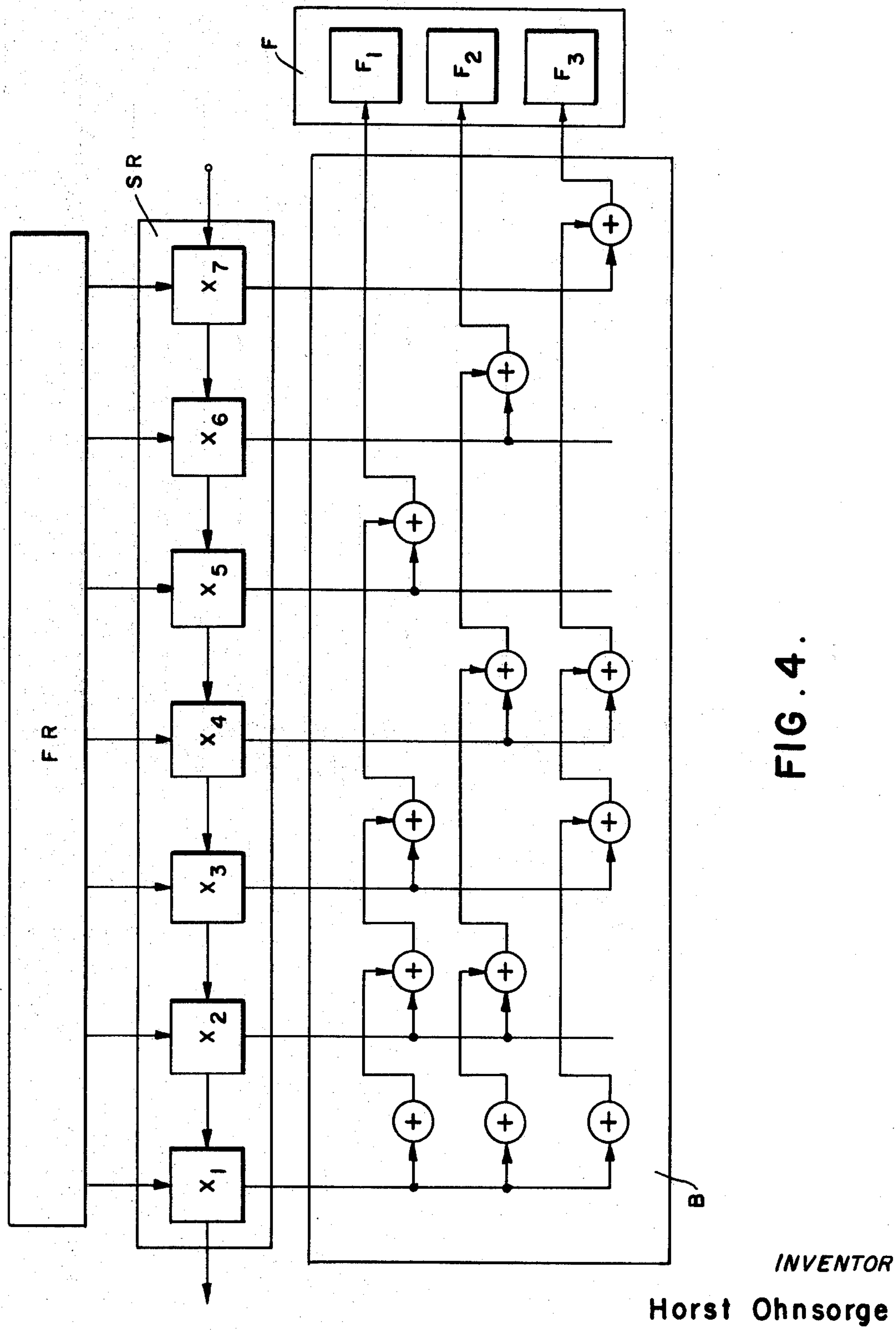
FIG. 4 is a schematic diagram of one portion of the arrangement of FIG. 2.

This operation is achieved by the network B, described above and illustrated in the accompanying drawings in FIG. 4. In the network B the following mathematical operation is performed:

$$[b]\cdot[x^{++}]=\begin{bmatrix}1&1&1&0&1&0&0\\1&1&0&1&0&1&0\\1&0&1&1&0&0&1\end{bmatrix}\cdot\begin{bmatrix}1\\0\\1\\0\\0\\0\\1\end{bmatrix}=\begin{bmatrix}0\\1\\1\end{bmatrix}=[F]$$

The components of the error code [F] at the end of the operation standing in the stages $F_1$ to $F_3$ of the network F.

Since there is only one erroneous bit in the received code, the error code [F] contains the components of column 4 of the matrix [$b$] if one numbers the columns of the matrix [$b$] in the same way as the bits of the received word. In the shift register FR now error correcting words $[f]=(f_1\ f_2\ f_3\ f_4\ f_5\ f_6\ f_7)$ are produced until the error correcting word $[f]=(0\ 0\ 0\ 1\ 0\ 0\ 0)$ appears at the outputs of the shift register FR. With this special error correcting word by the operation $[x^{++}]\oplus[f]=[x^{+}]$ the corrected code word is found. The symbol $\oplus$ in the above equation means that the components of the codes $[x^{++}]$ and $[f]$ are added modulo 2. If there had been no error in the received word $[x^{++}]$ then the operation $$[b]\cdot[x^{+}]=\begin{bmatrix}1&1&1&0&1&0&0\\1&1&0&1&0&1&0\\1&0&1&1&0&0&1\end{bmatrix}\begin{bmatrix}1\\0\\1\\1\\0\\0\\1\end{bmatrix}=\begin{bmatrix}0\\0\\0\end{bmatrix}=[F]$$

would have led to an error code $[F]=0$. This means, the transmission was free of errors.

The correcting process e.g. is performed in the following manner:

The received word $[x^{++}]$ reaches from the input the stages $x_1$ to $x_7$ of the shift register SR. In the shift register FR now the error correcting words $[f]_1$ are produced, corresponding to the probability of the errors in the received word. The first error correcting word is added to the content of the stages of the shift register SR, corresponding to the mathematical operation $[f]_1\oplus[x^{++}]$. If the error code [F] of this sum not equals zero, then the same error correcting word is added once more and the next error correcting word $[f]_2$ is added and the sum is checked again. This procedure is repeated until the error code equals zero, which means that now the content of the shift register SR represents a correct code word $[x^{+}]$.

Since for every correctable code word there must be one and only one error correcting word [$f$] and further since there exist only $2^m-1$ error correcting words, which are different from zero, the maximum number of steps that lead to a correction is $2^m-1$. Since further step by step those error correcting words are selected, which lead most likely to a correction, there is a high probability that the correction is achieved in many of the checking procedures with a number of steps, which is essentially smaller than the maximum number of possible steps. For the purpose of an easier understanding the example chosen shows a code with only one correctable error. It should however be emphasized that the invention shows, compared with known systems, the optimal efficiency with codes for two or more correctable errors.

According to a second view of the problem with which the present invention is concerned, it can be assumed that a received word is the result of the modulo 2 addition of a code word and a binary combination designated as an error-correction word.

Since it is known from the rules for modulo 2 addition that a double modulo 2 addition of a binary combination to a first binary combination will result in a return to the first binary combination, it must be possible, if the errors contained in the received word are correctable, to correct these errors by the modulo 2 addition thereto of a certain error-correction word and thus to restore the originally transmitted code word. Since it is in fact the error-correction word which can be considered to have been added to the code word that determines the error code, each correct code word resulting in an error code $[F]=0$, this error-correction word must have the same error code as the received word in question.

On the basis of these considerations, an error-correction is effectuated, according to the present invention, in the following manner: When a received word appears having an error code $[F]\neq 0$, there is selected from a predetermined number of error-correction words that particular error-correction word which upon multiplication with the matix [$b$] will result in an error code which is identical with the error code of the received word. This particular error-correction word is then added to the received word by modulo 2 addition of the corresponding bits of the two words so as to produce the desired code, i.e., the code word which is identical with the transmitted code word.

The error-correction word, in this case, is understood to be a $n$ bit binary combination which is such that the modulo 2 addition of its bits with the corresponding bits of the received code word will result in a code word $[x^{+}]$ which is a corrected version of the received word $[x^{++}]$.

Figure 3:
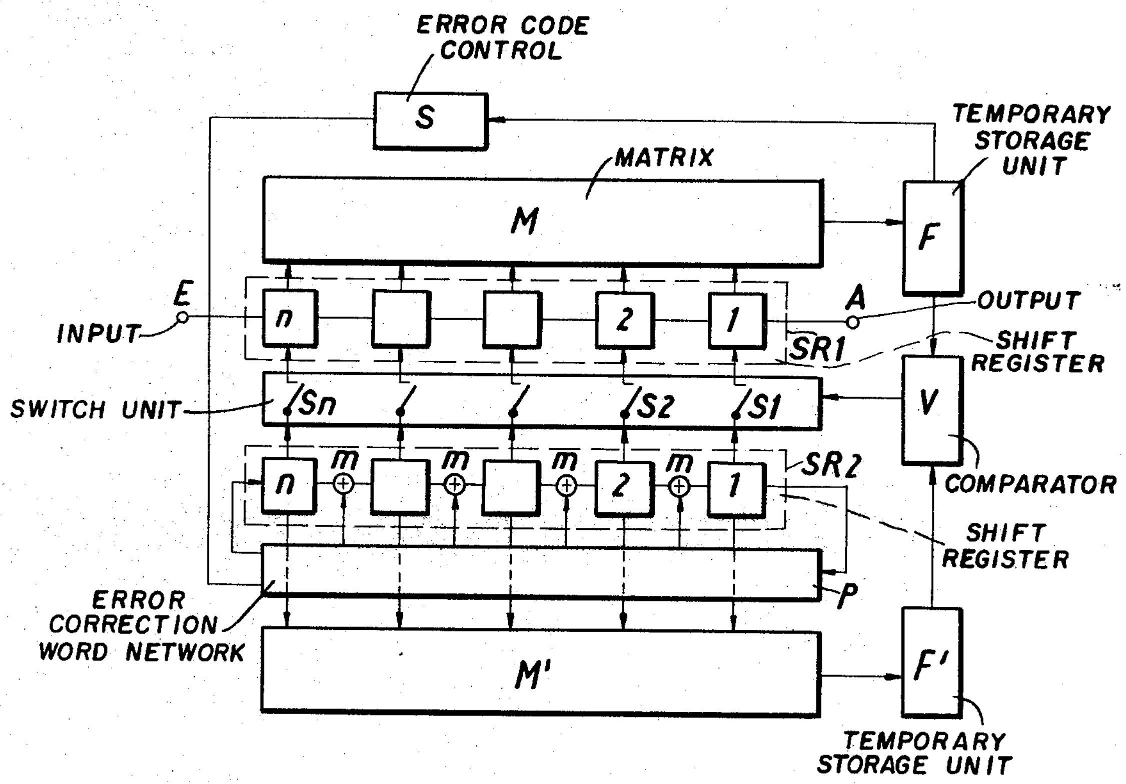
FIG. 3 is a simplified schematic diagram of another embodiment of the present invention.

FIG. 3 shows one arrangement for carrying out this procedure. The binary data, or received word, arriving at the input E of the arrangement is first stored in a shift register SR1 having a number of stages $n$ equal to the number of bits in each received word. The outputs of the individual stages 1, 2 . . . $n$ of the shift register SR1 lead to a coding circuit M which is constructed to provide a representation of the coding matrix [$b$]. When a received code word $[x^{++}]$ is fed into the circuit M, the output therefrom will be in the form of an error code [F] which appears at the temporary storage device F.

If the error code for a particular received word equals 0, this word has been correctly transmitted and is read out directly via the output A, this being effectuated by the application to the shift register SR1 of clock pulses in a manner which is well known, per se.

However, if the error code for a received word does not equal 0, then the word has not been correctly transmitted, and the device S which is connected to the output of the device F is activated to generate a binary code corresponding to the characteristic features of the particular error code [F]. This binary combination is written into a network P disposed in the feedback loop of a second shift register SR2 which has the same number of stages 1 to $n$ as the shift register SR1. The stages of the second shift register SR2 are connected to each other via modulo 2 addition circuits $m$ each having a second input connected to a respective output of the network P. The shift register SR2 functions to generate a series of error-correction words, in dependence on the feedback provided by the network P, one of which error-correction words must be identical to that which is considered to represent the error appearing in the received code word then present in shift register SR1.

Each of the stages 1 to $n$ of the shift register SR2 has two outputs one of which leads through a respective one of the switches S1 to S$n$ to an input of a corresponding one of the stages of shift register SR1 and the other of which leads to a respective input of a second coding circuit M'. Circuit M' is identical in construction with circuit M and represents an identical matrix. At the output of circuit M' there is a second temporary storage device F' which is identical with the storage device F. Each of the devices F and F' has an output connected to a comparison circuit V which is activated to close all of the switches S1 to S$n$ when the output signal from the two devices F and F' are identical. When the switches close, the contents of the individual stages of the second shift register SR2 will be added by modulo 2 addition to the contents of the corresponding stages of the first shift register SR1, the stages of this latter shift register being arranged to cause such an addition to be effectuated.

It is of course possible, by appropriate changes in circuitry, for example by employing multiplexing, to employ a single matrix circuit in place of the two circuits M and M′ and a single storage device in place of the devices F and F′, two such arrangements of each type having been shown in FIG. 3 in order to simplify the explanation of the principles of the present invention.

It should be noted that it is not absolutely necessary, according to the present invention, to arrange the device F so as to produce a preselection of the error-correction words. Rather, it is possible to generate only certain groups of error-correction words, in which case it is advantageous to generate a series of groups of error-correction words with the words of each group having the same weight $g$ and to then arrange the sequence of the groups according to the probability of the occurrence of error-correction words of a certain weight. In most cases, the sequence $g=1, 2, 3 \ldots e$ results, where $e$ designates the maximum number of correctable binary errors, since the probability of $i$ errors occurring in a received word usually decreases as $i$ increases from 1 to $e$.

Moreover, it is not absolutely necessary to generate the error-correction words in a shift register. It is also possible to store the error-correction words in a separate memory, even though this would increase the cost of the entire device.

According to another possibility for the construction of arrangements according to the present invention, the adjustable network P can be eliminated and, instead, a binary combination can be inserted into the shift register SR2, which combination corresponds to the error code generated from the received word. Then, a cyclic displacement of the data stored in register SR2 can cause the generation of that group of error-correction words which contains the desired error-correction word. In this embodiment, in contradistinction to the embodiment shown in FIG. 3, the feedback loops of the shift register SR2 will be permanently connected to generate all possible error-correction word groups.

Moreover, the present invention permits the determination, without additional expenditures, of the number of binary errors in a received word for which there is to be only an indication of the presence of errors.

All of the devices illustrated in FIG. 3 may be constituted by well-known, commercially available units.

The unit S may be similar in construction to the unit Z of FIG. 2. Similarly, the circuits M and M′ are preferably identical with the matrix B of FIG. 2, while the devices F and F′ are identical to one another and to the device F of FIG. 2. Finally, the shift register SR1 of FIG. 3 may be identical with the register SR of FIG. 2.

The shift register SR2 of FIG. 3 is provided with feedback so that not only successive stages are connected to one another, but also stages which are not directly adjacent one another are connected together via feedback loops. The input signal for some of these stages is generated by the output from a modulo 2 addition circuit whose inputs receive the output signal from the immediately preceding stage and the output from some other stage. Such shift registers having feedback are described in the previously cited Peterson text.

The comparison circuit V could be composed of a number of AND-circuits equal to one more than the number of bits in the error code. All but one of these circuits could have two inputs each of which is connected to a corresponding stage of a respective one of the units F and F′. The remaining AND-circuit has a plurality of inputs, one of each of the other AND-circuits with each input being connected to an output of one such circuit. Such an arrangement will have a zero output only when identity exists between the contents of all of the corresponding stages of both of the units F and F′.

The network P could be constructed as a shift register having a plurality of bistable flip-flop stages into which the binary combinations delivered by the device S are stored. The outputs of the individual stages are each connected with the input of a respective AND-circuit, the second input of each of these AND-circuits being connected to the output of a respective one of the stages of the shift register SR2. The outputs of the AND-circuits are connected to respective modulo 2 addition circuits provided between the stages in the register SR2. The states of the bistable stages of the network P will determine which of the AND-circuits are open and thus which of the feedback loops in the shift register SR2 will be effective.

It will be understod that the above description of the present invention is susceptible to various modifications, changes and adaptations, and the same are intended to be comprehended within the meaning and range of equivalents of the appended claims.

What is claimed is:

1. For use in a data handling system in which binary data is transmitted over a transmission path in the form of a systematic code composed of $n$ bit words each made up of a data code having $k$ bits and a test code having $m$ bits, where $k+m=n$, and the test code is the product of the data code multiplied by a coding matrix $[a]$, and where each code word appearing at the end of the transmission path will, if multiplied by a test matrix $[b]$, which is formed by the matrix $[a]$ supplemented by the unit matrix [I], yield an error code [F] which is no greater than a predetermined value if no errors are present in the data code portion of the received word and which is greater than such value if an error is present in the data code portion of the received word, an error detection and correction apparatus comprising, in combination:

- first register means having $n$ stages and connected to receive each received word in succession;
- matrix means providing an electrical circuit representation of the matrix $[b]$ and connected to each stage of said register means for producing an output representing the error code [F] for each received word; and
- test means connected to the output of said matrix means for selecting, whenever [F] is greater than such predetermined value, that one of a predetermined number of $k$ bit error-correction words which, when each bit of the error-correction word is added to a corresponding bit of the received word data code portion by modulo 2 addition, results in a word whose error code [F] equals zero.

2. An arrangement as defined in claim 1 further comprising correction means including modulo 2 addition means associated with said register means and said test means for adding each bit of such one error correction word to the corresponding bit of the received word so as to change the received word into the correct originally transmitted word.

3. An arrangement as defined in claim 1 wherein said matrix means include at least one binary matrix circuit comprising: a plurality of column wires each connected to receive a respective bit of a word to be multiplied by the test matrix; a plurality of row wires each providing a respective bit of the resulting error word; and at least one modulo 2 addition element connected between at least one said column wire and one said row wire, there being one said element at each intersection of said wires corresponding to a binary "1" of the matrix.

4. An arrangement as defined in claim 1 wherein said test means are connected for performing a modulo 2 addition of each of the predetermined number of error-correction words to the received word then in said register means and for obtaining the error code for the addition word thus formed until one such addition word yields an error code equal to zero.

5. An arrangement as defined in claim 4 wherein, for a given received word whose error code is not equal to zero, there is a maximum of $2^m-1$ error-correction words each corresponding to a received word having between one and *e* errors, with *e* being the largest number of correctable errors, and wherein said test means are arranged for subdividing the possible error-correction words into *e* groups, with each group containing error-correction words relating to the same number of errors, and for grouping all possible error codes for each received word into *e* groups, with each group being associated with a certain number of error-correction words.

6. An arrangement as defined in claim 5 wherein each of the error-correction words generated relates to between one and *i* received word errors, where *i* is less than *e*, and wherein said test means are arranged to provide an indication of the existence of a noncorrectable error when the addition of each error-correction word to the received word results in an error code which is unequal to zero.

7. An arrangement as defined in claim 6 wherein all of the error-correction words are divided into *i* groups, with each group containing only error-correction words associated with the same number of errors, and wherein all error codes are combined into *e* groups, *i* groups of which are associated with a particular group of error-correction words, and wherein said test means provide an indication of the existence of a noncorrectable error when the error code for the received word corresponds to one of the remaining $e-1$ groups.

8. An arrangement as defined in claim 4 wherein said test means comprise a shift register having multiple feedback for generating the predetermined number of error-correction words.

References Cited

UNITED STATES PATENTS

| | | | |
|---|---|---|---|
| 3,159,810 | 12/1964 | Fire | 340—146.1 |
| 3,164,804 | 1/1965 | Burton | 340—146.1 |
| 3,373,404 | 3/1968 | Webb | 340—146.1 |
| 3,340,507 | 9/1957 | Hotz | 340—146.1 |

MALCOLM A. MORRISON, Primary Examiner

C. E. ATKINSON, Assistant Examiner

U.S. Cl. X.R.

235—153